J. CADWELL.
Fertilizer.

No. 40,605. Patented Nov. 17, 1863.

Witnesses:
J W Coombs
Geo V Reed

Inventor:
Jason Cadwell
per Munn & Co.
Attys

UNITED STATES PATENT OFFICE.

JASON CADWELL, OF DEXTER, MICHIGAN.

IMPROVEMENT IN MANURE-DISTRIBUTER.

Specification forming part of Letters Patent No. 40,605, dated November 17, 1863.

*To all whom it may concern:*

Be it known that I, JASON CADWELL, of Dexter, in the county of Washtenaw and State of Michigan, have invented a new and Improved Device for Sowing Plaster and other Pulverulent Manures on Plants; and I do hereby declare that the following is a full, clear, and exact description of the same, reference being had to the accompanying drawings, making a part of this specification, in which—

Figure 1:
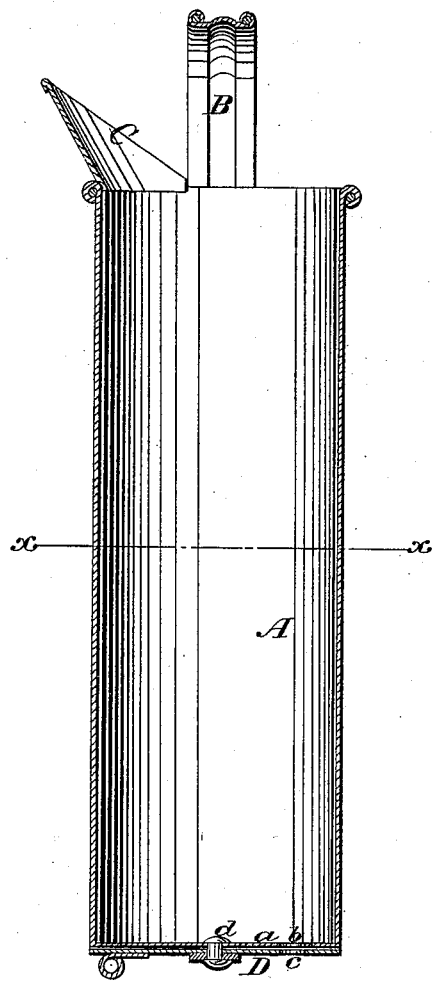
Figure 2:
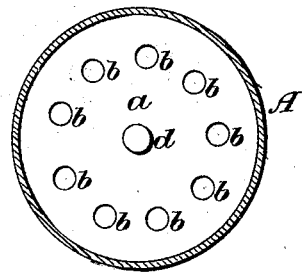

Figure 1 is a vertical central section of my invention; Fig. 2, a horizontal section of the same taken in the line $x$ $x$, Fig. 1.

Similar letters of reference indicate corresponding parts in the several figures.

The object of this invention is to obtain a device of simple construction for sowing plaster and pulverulent manures on plants—one which will admit of the work being done with the greatest facility and in a far more perfect manner than it can be done by applying it with the hands.

The invention consists in the employment or use of a vessel for containing the manure constructed of either wood or metal, and provided with a perforated bottom and a register, as hereinafter fully set forth.

To enable those skilled in the art to fully understand and construct my invention, I will proceed to describe it.

A represents a vessel for holding the plaster or other pulverulent manure to be sowed. This vessel may be constructed of wood or metal, and of cylindrical or other form. It may be about twenty (20) inches in length by four and a half (4½) inches in diameter, provided at its upper end with a fixed bail or handle, B, and a spout, C, the latter to serve as a convenience in filling it. The bottom $a$ of the vessel A is perforated with a series of holes, $b$, in the form of a circle and near its edge, as shown clearly in Fig. 2, and to the under side of the bottom $a$ there is attached a register, D, which is perforated with holes $c$, coinciding with the holes $b$ in the bottom $a$ of the vessel. The register D is attached to the bottom $a$ by means of a pivot, $d$.

The device is used as follows: The vessel A is supplied with a requisite quantity of plaster or other pulverulent manure to be sowed, and the register D is adjusted so as to allow the requisite quantity of manure to pass through the bottom $a$. The sowing or distributing of the manure is effected by a quick movement and sudden stopping of the device in a vertical direction, the manure falling evenly around the plants.

The advantages of the invention are as follows: The work can be done much more expeditiously than it can be done by hand. It can be used without the operator stooping, as is necessary when the manure is applied directly by the hand, and will perform the work equally as well when the wind is blowing as when it is not. The plants will not be injured by the falling of the manure upon them, as is frequently the case when spread by hand.

The register D is essential, first, to regulate the discharge of the manure in greater or less quantity, as desired; and, second, to cut off the discharge when the vessel is filled and being carried to the place where it is to be used.

Having thus described my invention, what I claim as new, and desire to secure by Letters Patent, is—

The vessel A, provided with a handle, B, and a perforated bottom, $a$, and with or without the register D, substantially as and for the purpose herein set forth.

JASON CADWELL.

Witnesses:
    PETER TUITE,
    GEO. S. SILL.